(12) United States Patent
Meeks-Matous

(10) Patent No.: US 8,703,284 B1
(45) Date of Patent: Apr. 22, 2014

(54) AEROGEL/XEROGEL COMPOSITE MATERIAL AMALGAMATED WITH SINGLE-WALLED CARBON NANOTUBES FOR MULTIPURPOSE USAGE

(76) Inventor: Joel Ricardo Lee Meeks-Matous, Los Angeles, CA (US)

( * ) Notice: Subject to any disclaimer, the term of this patent is extended or adjusted under 35 U.S.C. 154(b) by 695 days.

(21) Appl. No.: 09/844,554

(22) Filed: Apr. 28, 2001

Related U.S. Application Data

(60) Provisional application No. 60/200,362, filed on Apr. 28, 2000.

(51) Int. Cl.
   *B32B 5/12* (2006.01)
   *C08J 9/26* (2006.01)

(52) U.S. Cl.
   USPC ......... 428/317.9; 521/61; 521/64; 423/445 R; 423/447.3; 977/742

(58) Field of Classification Search
   USPC ............ 428/319.7, 317.9; 423/447.3, 445 R; 521/61, 64; 977/742
   See application file for complete search history.

(56) References Cited

U.S. PATENT DOCUMENTS

| | | | |
|---|---|---|---|
| 5,366,828 A | 11/1994 | Struthers | |
| 5,429,886 A | 7/1995 | Struthers | |
| 5,601,938 A | 2/1997 | Mayer et al. | |
| 5,698,140 A | 12/1997 | Lamb et al. | |
| 5,908,896 A | 6/1999 | Mayer et al. | |
| 2003/0012722 A1* | 1/2003 | Liu | 423/447.3 |

OTHER PUBLICATIONS

Hunt et al., "Aerogel Composites using Chemical Vapor Infiltration", Journal of Non-Crystalline Solids, vol. 185 (1995) p. 227-232.*
Mirsky, S., "Tantalizing Tubes," Scientific American, Jun. 2000, pp. 40-42.
Kistler, S. S., "Coherent Expanded Aerogels," J. Phys. Chem., 1932, pp. 52-64, vol. 36.
Silbond Corporation, Material Safety Data Sheet, Sep. 29, 2011, pp. 1-8.
Sigma-Aldrich Corporation, Material Data Safety Sheet, Nov. 5, 2012, pp. 1-6.

* cited by examiner

*Primary Examiner* — Hai Vo
(74) *Attorney, Agent, or Firm* — Schwabe, Williamson & Wyatt, P.C.

(57) ABSTRACT

An amalgam comprising a highly porous, carbon-enveloped structure, such as aerogel. The carbon dispersion within the aerogel substrate consists of sonicated (using ultrasonic cleanser) carbon nanotubes, which can be inserted into the aerogel/xerogel through various techniques. Procedures include mixture of nanotubes to any aerogel/xerogel preparation solution prior and/or during solgel/alcogel stage; addition of nanotubes to aerogel during any solvent exchange with liquids (ethanol, etc.) or gas (carbon dioxide, etc.) as a solgel/alcogel; permeation of vapor containing nanotubes (by way of carbon burning using the Kratschmer-Huffman, or any other related, similar machine) in aerogel/solgel/alcogel/xerogel pore structure and/or preparation solutions; intravenous introduction of nanotubes, manually or by way of any conveyance device (i.e. syringe) to finished aerogels/xerogels or solgels/alcogels.

17 Claims, 9 Drawing Sheets

AEROGEL/XEROGEL COMPOSITE MATERIAL AMALGAMATED WITH SINGLE-WALLED CARBON NANOTUBES FOR MULTIPURPOSE USAGE

CROSS REFERENCE TO RELATED APPLICATION

The present application claims priority to U.S. Provisional Application No. 60/200,362, filed Apr. 28, 2000.

BACKGROUND

Silica Aerogels are a seemingly new creation, when in fact, they have been in existence (theoretically) for nearly 70 years. In 1931, Steven. S. Kistler first set out to prove that a "gel" contained a continuous solid network of the same size and shape as the wet gel. The obvious way to prove this hypothesis was to remove the liquid from the wet gel without damaging the solid component. "Obviously, if one wishes to produce an aerogel [Kistler is credited with coining the term "aerogel"], he must replace the liquid with air by some means in which the surface of the liquid is never permitted to recede within the gel. If a liquid is held under pressure always greater than the vapor pressure, and the temperature is raised, it will be transformed at the critical temperature into a gas without two phases having been present at any time." (S. S. Kistler, J. Phys. Chem. 34, 52, 1932).

Further advancement in this research was prolonged until the late 70's, when the specific, correct procedure for creating Aerogels was developed. Basically, and Aerogel is simply a Silica water-based gel, that has been exchanged with ethanol (to remove water), then supercritically dried (to remove the ethanol) in order to excavate ALL liquid, leaving a 3 dimensional matrix, resulting in a retention of surface area and in increase in free-space. Amazing Characteristics of Aerogel include its low solid percentage (0.13-15% solid, typically 95% air), high internal surface area (600-100 $m^2/g$), a low index of refraction (1.0-1.05, close to that of AIR) and high thermal tolerance (shrinkage begins at 500° C.; melting point 1200° C.). Unfortunately, it is somewhat unstable, with a maximum tensile strength of 48 kPa (48,000 Pa), which accounts for its brittleness.

Carbon Nanotubes (CNT), on the other hand, are a relatively new discovery. These stem from the detection of a class of allotropes of carbon, the fullerenes (which are perfect "cages" of Carbon atoms in geometric configurations, usually even-numbered between 60-80). Carbon fullerenes can be located in soot as produced by the Kratschmer-Huffman (a machine which, along with high-temperatures, arcs electricity between two sticks of carbon) arc process. Single-wall nanotubes can also be found in the arc, usually in the presence of a metal catalyst. The nanotubes are found in the matted soot deposited on the reaction chamber wall. Japanese scientist Sumio Iijima is credited with discovering the nano-size tubes during experimentation in late 1991. Recently, nanotubes with unique characteristics and unusually small/large areas/diameters can be produced using a laser burning technique, which produces carbon "ropes". Carbon Nanotubes (CNTs) consist of concentric shells of graphite. Each shell can be thought of as one layer of a conventional graphite structure rolled up into a cylinder such that the lattice of carbon atoms remains continuous around the circumference. These are known as Multi-Walled Nanotubes (MWNT), whereas Single-Walled Nanotubes (SWNT) have only a single "shell of graphite". CNTs are usually 1-50 nanometers in diameter and typically a few microns long, although recently SWNTs have been grown to over 300 microns. Even though the nanotubes are extremely small, they are currently renown as the stiffest, strongest materials known, possessing the ability to be bent and warped without breaking and then be bent back into their original shape. To express this numerically, the nanotubes have an average tensile strength of 1.3 TPa (1,300,000,000,000 Pa), able to sustain a critical stress of 156 GPa (156,000,000,000 Pa) before collapsing plastically.

Examples of similar inventions with similar application as the embodiments described herein include Hydrocarbon (Hydrogen)/Air Aerogel Catalyzed Carbon Electrode Fuel System Cell System: U.S. Pat. No. 5,429,886, issued Jul. 4, 1995; Carbon Aerogel Electrodes For Direct Energy Conversion, U.S. Pat. No. 5,601,938, issued Feb. 11, 1997; Organic Aerogel Microspheres, U.S. Pat. No. 5,908,896, issued Jun. 1, 1999; and Metal Alloy Laded Carbon Aerogel Hydrogen Hydride Battery, U.S. Pat. No. 5,366,828, issued Nov. 22, 1994.

SUMMARY OF INVENTION

Disclosed herein are silicon aerogel-carbon nanotube composites and methods of making and using these composites. The composites disclosed herein may be more efficiently made than previous similar composites (both time-wise and financially), may have broader application than previous similar composites (which are limited to minor usage cases) and may be mechanically stronger than previous similar composites. Computer chips using the composites disclosed herein as a substrate are also disclosed.

BRIEF DESCRIPTION OF THE DRAWINGS

FIGS. 1-7 describe the process in which the carbon aerogels are produced.

FIGS. 1 and 2a-2b are images of the preparation of the gel solution (first part of the process being Nanotube dispersion).

FIG. 3 shows an image of the preparation of the gel solution (second part of the process being amalgamation and vacuum treatment).

FIGS. 4-5 show images of the gels being molded.

FIG. 6 shows images of the gels being decasted.

FIG. 7 shows images of the gels in aging solution and solvent changes.

DETAILED DESCRIPTION OF INVENTION

Figure 1:
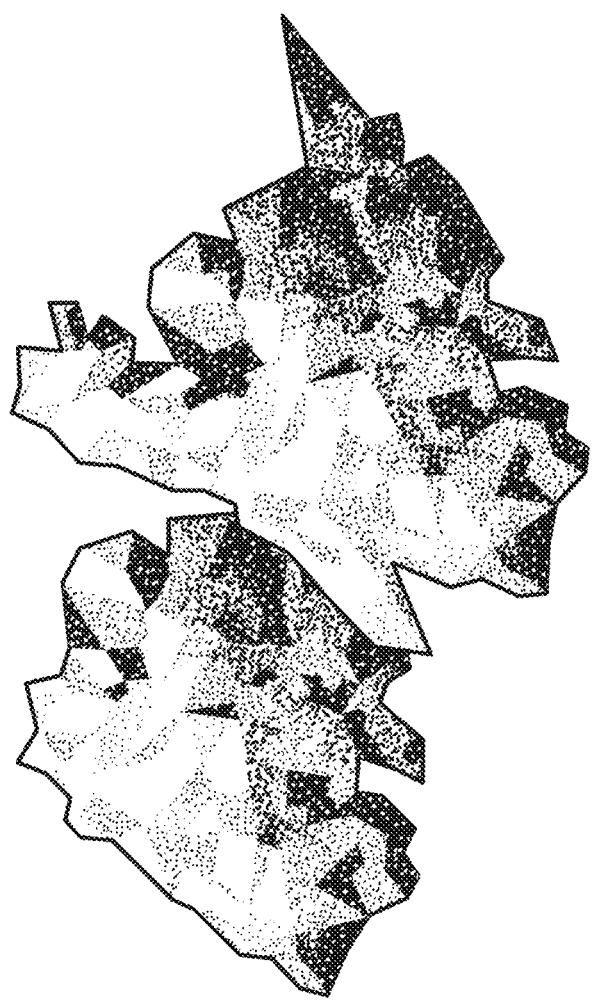

The goal of this invention has been envisioned over a significant time period and tedious process. In the summer of 1998, the aim was to create a unique multi-purpose frame. The multi-purpose frame would be used in various fields, among them, the aerospace and prosthetics industries. The search for a new material began, when it was evident that current high-performance composites were substandard for this usage. Silica aerogel has been regarded as the lightest material ever, and had been used as an insulator on the Mars land rover in 1997. Experimentation was performed with various forms of carbon and carbon composites, including graphite, polycarbonate, and carbon fullerenes. It was concluded that carbon nanotubes would be the best choice as the addition to silica aerogel. In the end, it was discovered that this invention was not only more efficient (both time-wise and financially), but was also better than similar inventions, whose application was limited to minor usage.

Another of the primary goals of this research was to discover if this novel new composite could one day be altered for a replacement to the current silicon computer chip. Silicon, the current material used for computer microprocessors, has a dielectric constant of about 13. This means that only so many transistors can be placed on the area, before they are not applicable. It should be noted that the lower the dielectric constant, the more circuits/transistors can be placed in a given area. Silica aerogel maintains a dielectric constant of about 1.1, which is very low, considering air has a perfect dielectric of 1. This means that nearly infinite transistors can be placed within an aerogel substrate. In a nanotube, the rows of carbon hexagons wind around the walls in spirals; the conductivity of the tube depends on the "slope" or "slant" of the helical structure. Some nanotubes (depending on their characteristic helix pitch) are conducting as well as semi-conducting, making it possible to combine both types for electrical circuitry. In order to create a "carbon-aerogel" silicon chip, this would require machines capable of manipulating nanotubes to form an "etched" silicon chip. AFM (Atomic Force Microscopy) is a possible tool, capable of moving, breaking, and bending nanotubes. A magnetic field could be used in conjunction with the AFM, since magnetic fields can align nanotubes in a specific direction.

Last been not least, research is currently being conducted to reinforce aerogels with nanotubes, to increase mechanical strength, allowing for more strenuous application for aerogels.

The following is from the article "Tantalizing Tubes" from the June 2000 issue of *Scientific American*. This excerpt briefly explains several of the applications of this material, including cellular phone signal amplification, materials strengthening capability, ion energy storage, and electron emission sources for flat-panel displays.

"Fortunately, not all electronic applications need to be so elegant. Even messy mixtures of multi-walled tubes are good at field emission—they emit electrons under the influence of an electrical field. And field emission is the force behind flat-panel displays. A deep-bellied television or computer monitor relies on a big gun to shoot electrons at the pixels of a phosphor screen, which light up as ordered. Alternatively, millions of nanotubes arranged just below the screen could take the place of the gun. "Each pixel gets its own gun," explains David Tomanek, a physicist at Michigan State University.

Several firms around the world are trying to exploit the nanotube talent in flat-panel displays. Researchers at the Samsung Advanced Institute of Technology in Suwon, South Korea, led by Won Bong Choi, appear to be in the lead. "Last Christmas they had a nine-inch display, and I could see baseball players," Tomanek relates. The prototype required half the power of conventional liquid-crystal displays, and the nanotubes appear to meet the 10,000-hour lifetime typically demanded of electronics components. Zhifeng Ren of Boston College has produced neat forests of multiwalled nanotubes directly on glass surfaces, showing the potential of growing nanotubes in place, with the screen as substrate.

The issue for displays then becomes the orderly operation of all those nanotubes.

"You have the complexity of now needing a separate circuit for every single pixel," points out Philip G. Collins, also of IBM's nanoscale group. Experts in conventional electronics need to find solutions to these intricate wiring problems before nanotube displays can become commonplace.

Nanotubes emit electrons at a relatively low voltage, which translates to minimal power requirements, while maintaining high current densities. These characteristics encouraged Otto Z. Zhou, a physicist at the University of North Carolina at Chapel Hill working with colleagues at Lucent, to try to generate microwaves via nanotube field emission, with implications for wireless communications. Cellular phones typically send a weak signal to a local base station, where microwave amplifiers beef up that signal.

"In principle, you could make the base station smaller, with a longer working life, thanks to the stability of the nanotubes," Zhou says. "We have a prototype that generates microwaves, the first time that that has been demonstrated in an electron emission material."

The battery designers are also keeping an eye on nanotubes. Graphite can store lithium ions, the charge carriers for some batteries, but at a weighty price: six carbon atoms for every lithium ion. Researchers speculate that the geometry inherent in bundles of nanotubes allows them to accommodate more than one lithium per six carbons. "It would be nice if you could access both the inside and the outside of the cylinder," remarks John E. Fischer, a materials scientist at the University of Pennsylvania, referring to both the insides of carbon nanotubes as well as the gaps between tightly packed tubes. "That's the leitmotif that runs through all research using nanotubes for anode materials," he adds.

The holy grail in this world is probably hydrogen storage. The target for hydrogen capacity that would interest electric-car manufacturers is about 6.5 percent by weight, in whatever storage medium is used. Dresselhaus, writing in the Materials Research Society Bulletin last November, pointed out that various claims exceeding 6.5 percent have been difficult to reproduce. She notes that 4 percent by weight of hydrogen is the best figure available and that increasing it to the benchmark "represents a significant technological future challenge."

The other major arena for the small tubes is in materials. Nanotubes are about six times lighter and 10 times stronger than steel at the same diameter. But that's an awfully small diameter. "The strength of a nanotube is something that people have talked about quite a lot," says materials scientist Paul D. Calvert of the University of Arizona. "But in the end, the strength that counts is the strength of the thing you make out of it." Carbon fiber is already a proven winner in composite materials, and carbon nanotubes certainly have promise in the same market because of their exceptionally high length-to-diameter ratio, the vital figure in stress transmission. But there are miles to go to fulfill that potential. At a January meeting, Calvert recounts, "the nicest statement was from a group that demonstrated that carbon nanotubes do not degrade the properties of the epoxy resin. In other words, we can make something that's no worse than if we didn't put the tubes in at all."

One of the biggest boosters of future materials applications is the National Aeronautical Space Administration, which hopes to find a place for nanotubes in everything from spacecraft to space suits. "But we have to figure out how to get the properties that are now on the nanoscopic scale up to something that we can use on a macroscale," says Bradley Files of the NASA Johnson Space Center of the nanotubes' low weight and high strength. "Every pound counts."

Embodiments of the present disclosure are now discussed. For the production of the composite material comprised of silica aerogel and single-walled carbon nanotubes, the two-step procedure (described below) was used.

One-Step Procedure:

The gel solution is made up of ethanol and tetraethylorthosilicate (TEOS), in a 4:5 ratio, respectively. For the SWNT+Aerogel samples, the SWNTs were added at this step. The ethanol, prior to adding it to the TEOS, was combined with SWNTs and sonicated for 1-2 hours, depending on amount, in a standard ultrasonic cleanser. In order to increase the gel time, a catalyst was added to the solution. The Catalyst consisted of $NH_4OH$ (30% aqueous), $NH_4F$ (0.5 M), rainwater, and ethanol (for uniformity, this catalyst was modified to an approximate ratio of 1:4:100:200, respectively). In early produced samples, the original catalyst formula had very little effect on the gel solution, with gelation lasting 20-50 hours. Eventually, a better formula was devised, consisting of a modified catalyst, in association with 1-4 drops (depending on volume) of pure $NH_4F$ added to gel/catalyst solution. This formula decreased gel-time from a minimum of 20 hours to 5-20 min. Once the full gelation had taken place, the solution was as a sol-gel. The Alcogel is suggested to be allowed up to one week to form a "complete", or aged gel (where the silica network has reached its maximum strength), without a special aging process (which decreases the time to less than 48 hours). The sol-gel was submersed in 1:1 ratio solution of ethanol and water. After the aging process, it was imperative that all water be removed before the final process of supercritical drying. This was achieved by repeatedly soaking the alcogel in pure ethanol (for up to 36 hours). At this point, the gel was ready for supercritical extraction.

Initially, a random gel (one-step sample) was given a surfactant (Surface Activated Reagent). This was done in order to keep the nanotubes bundles as separate as possible, aside from ultrasonication. This later became standard in procedure.

Figure 2A:
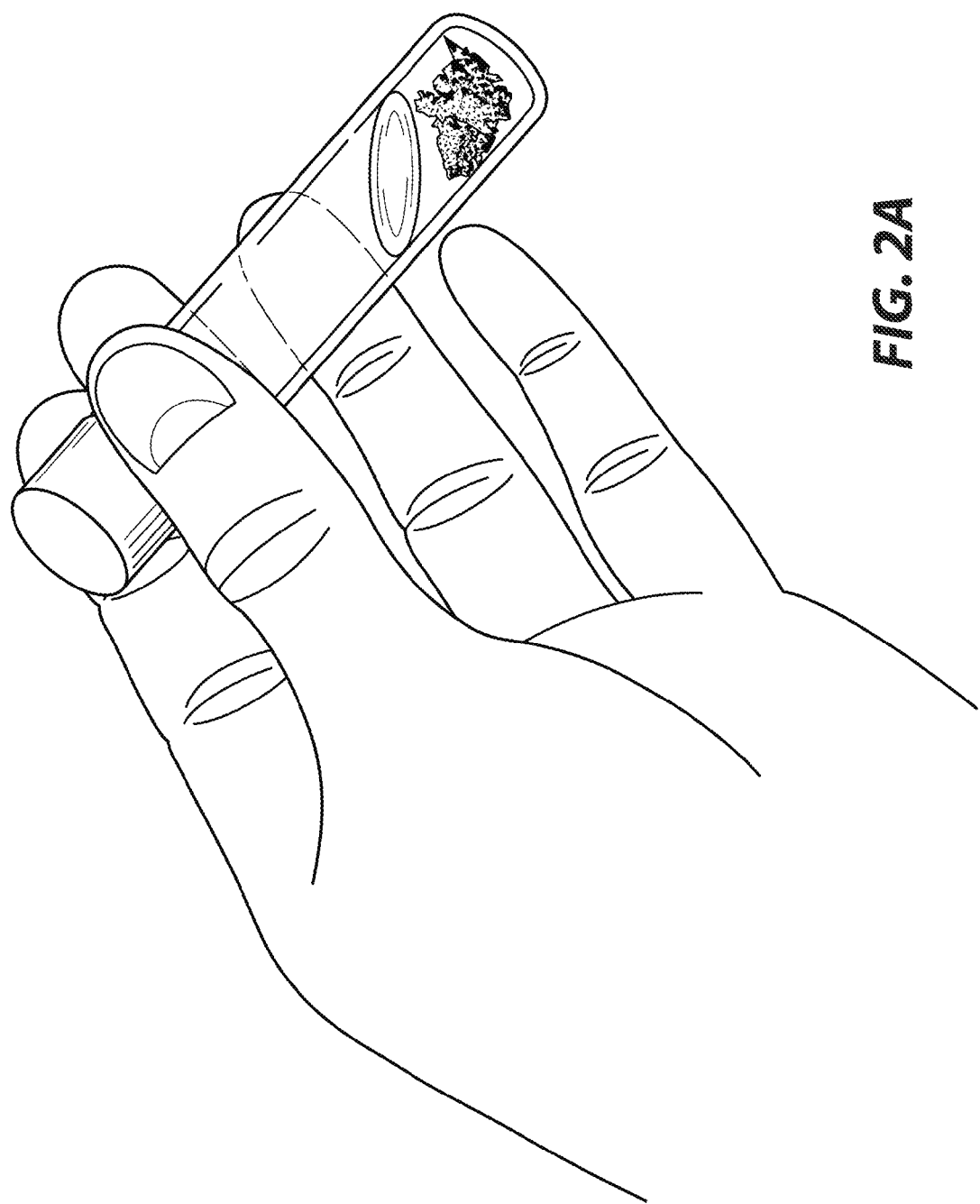
Figure 2B:
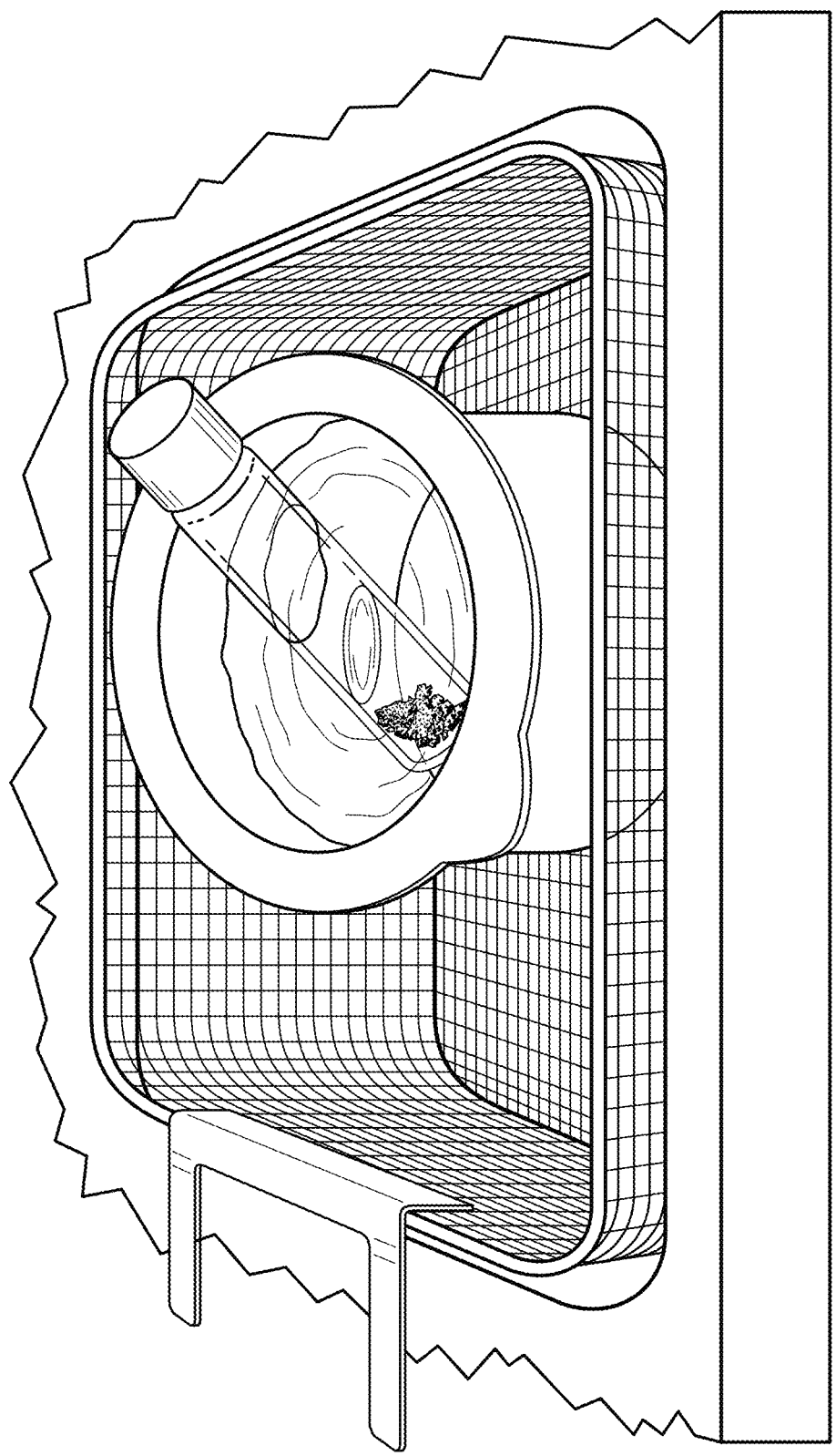

Two-Step Procedure:

The gel solution is made up of ethanol and pre-condensed silica (SILBOND H-5, an alkyl silicate that includes 73% ethyl alcohol and 27% ethyl polysilicate), in a 4:5 ratio, respectively. For the SWNT+Aerogel samples, the SWNTs were added to the stoichiometric amount of EtOH. Before adding the SWNTs to the SILBOND to form the gel solution, the nanotubes must first be distributed throughout the stoichiometric amount of EtOH. This is accomplished by ultrasonicating the SWNTs and EtOH in an ultrasonic cleaner (FIGS. 1 and 2a-2b). The ultrasonic pulse breaks up nanotube bundles, and allows for an even SWNT deposit. This solution of EtOH and SWNTs were sonicated for 1-2 hours, depending on amount, in a standard ultrasonic cleanser. If needed, a surfactant should be used, in order to aid nanotube fragmentation. TWEEN 40 (polyoxyethylenesorbitan monopalmitate) was used, due to its low viscosity.

Figure 3:
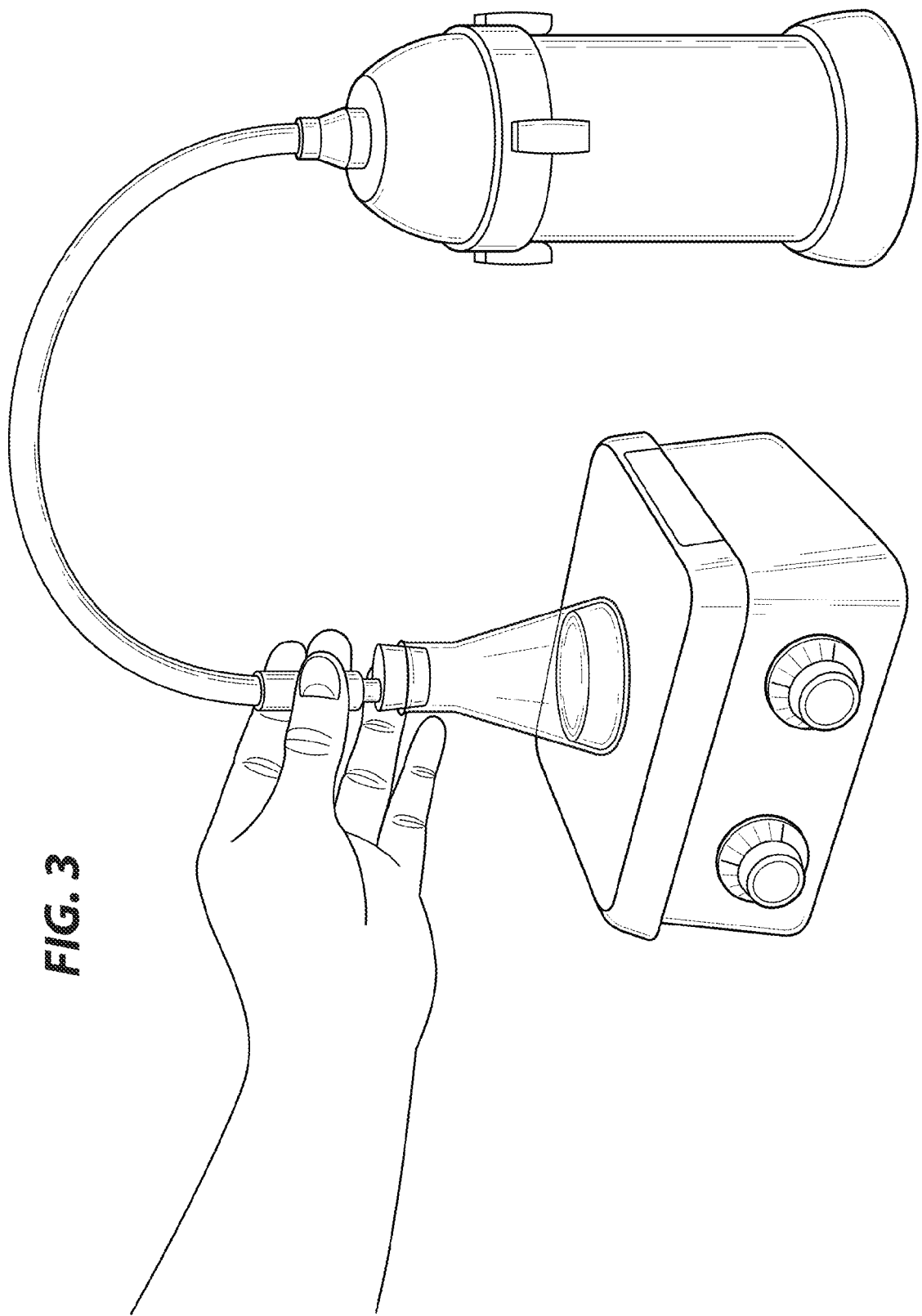

The sonicated SWNT+EtOH is added to the SILBOND, to form the gel solution. A catalyst is added, in order to complete all reactions, and speed up gel time. In order to insure that the formation of bubbles with in the gel does not take place (which is not evident until gelation). The solution is given a vacuum treatment, to vent out all unnecessary air bubbles (FIG. 3).

In order to increase the gel time, a catalyst was added to the solution, the catalyst consisting of $NH_4OH$ (30% aqueous), rainwater (for RW samples) or deionized water (for DI samples), and ethanol. After the solution was completed, a vacuum treatment was provided, in order to remove the formation of "bubbles" in the gel.

Figure 4:
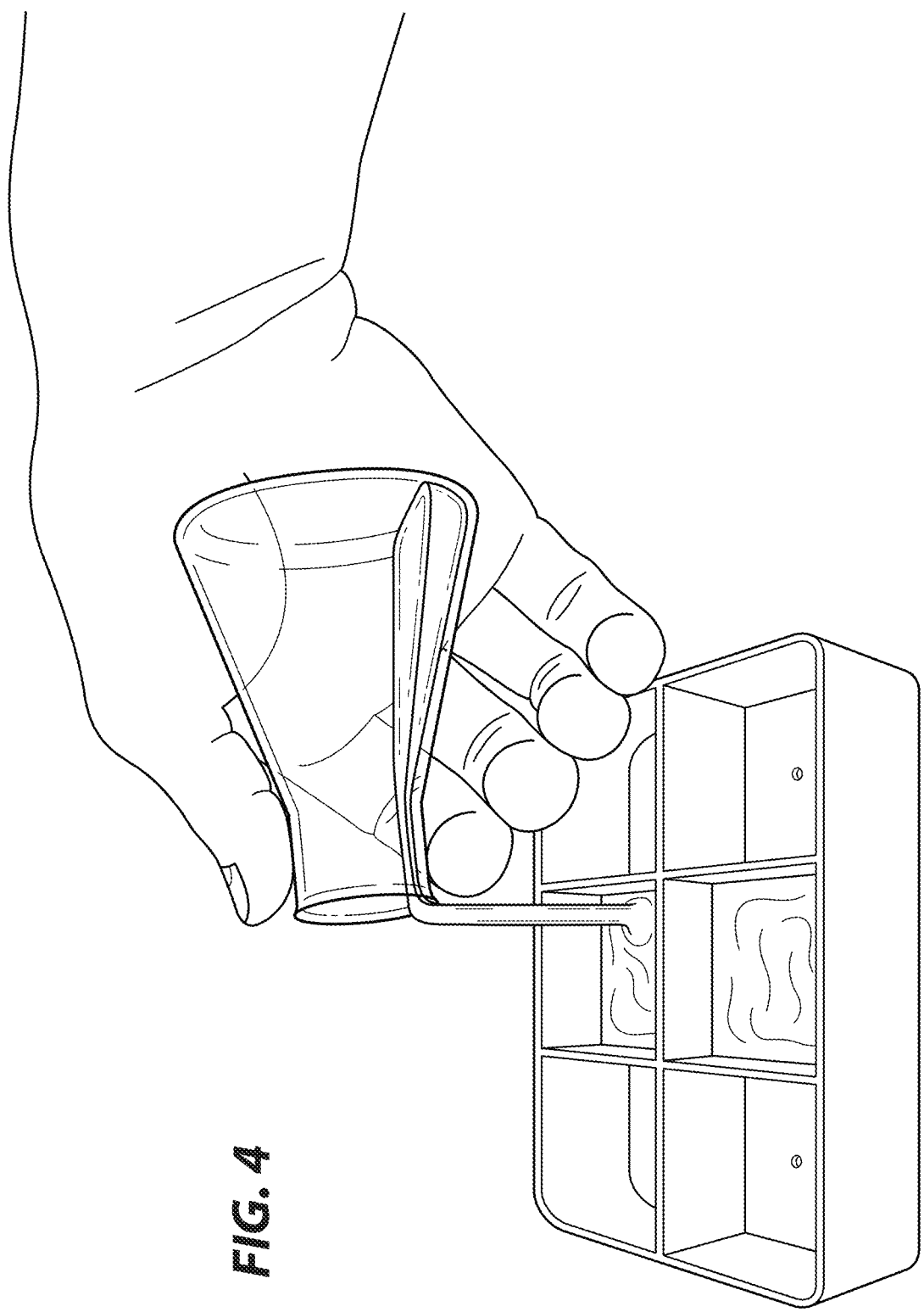
Figure 5:
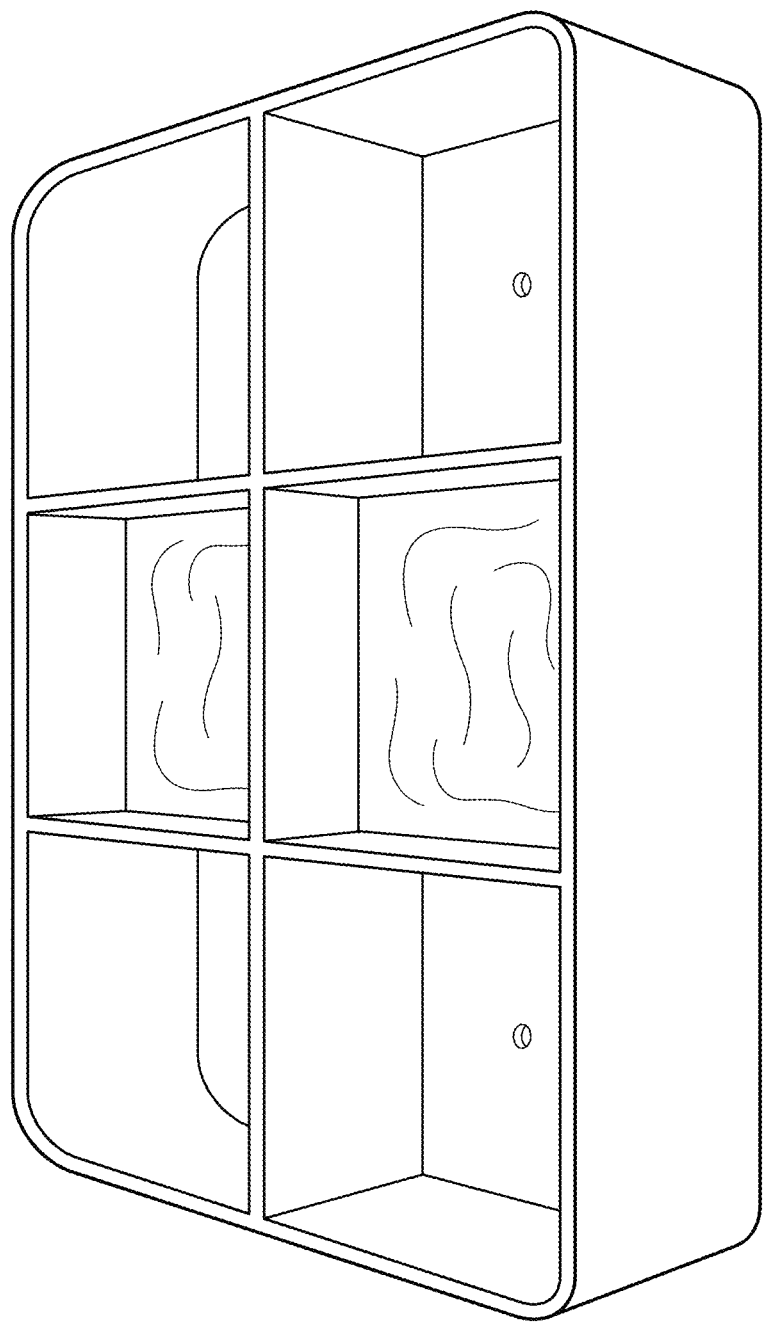
Figure 6:
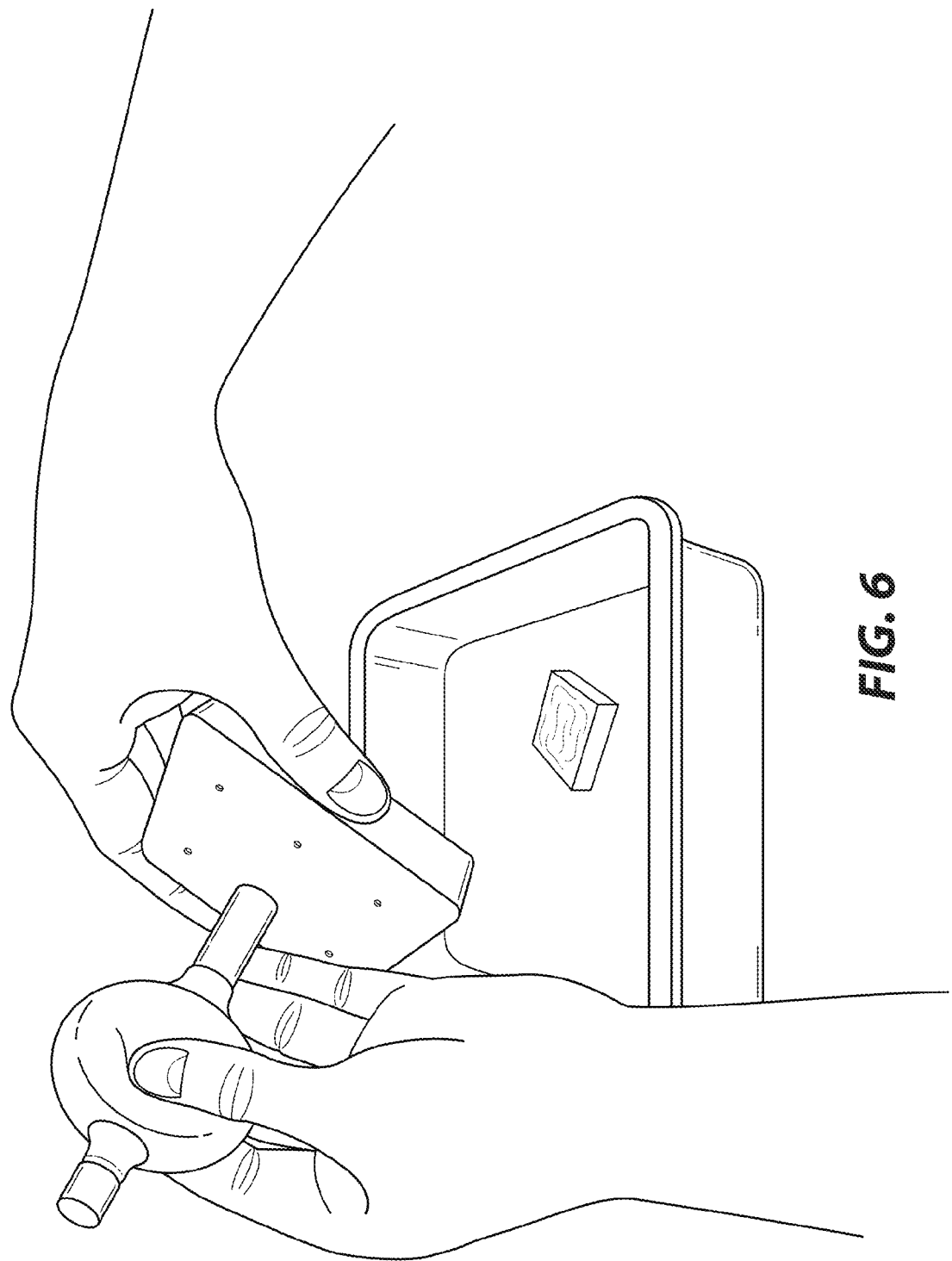

The sample was then sonicated in the ultrasonic cleanser until gelation (to ensure the even distribution of SWNTs remained). The gel solution was poured into molds, until full gelation occurs (FIGS. 4 and 5). This takes place, immediately following the vacuum treatment and sonication. The gel was removed from its mold (FIG. 6), and then submersed in the aging solution. A small plug (of paraffin) is removed from the bottom of the mold, leaving small hole. A pipette bulb is used to wedge the gel out of the mold, by shooting a small "puff" of air into the mold, through the hole. After two or three puffs, the sample comes out. This is a very tricky process, because if the air puff is too powerful, it can severely damage the gel.

Figure 7:
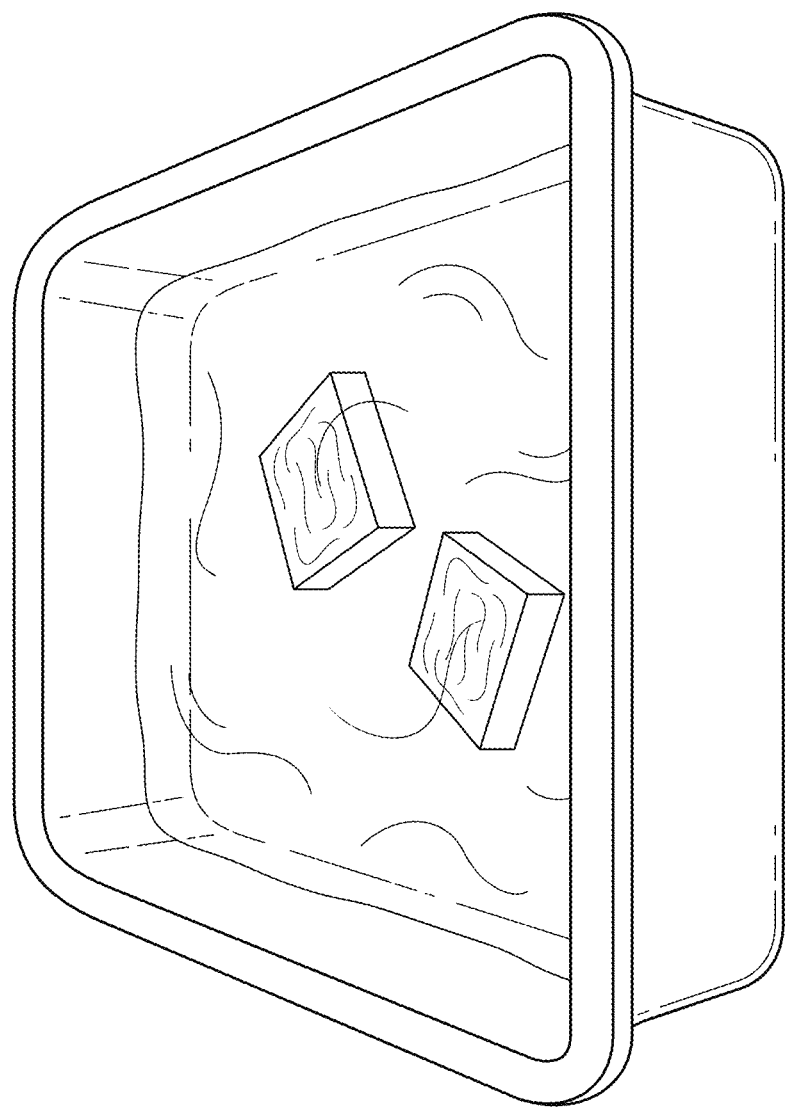

After decasting, the gels are soaked in an aging bath (FIG. 7). The bath consists of EtOH and $NH_4OH$, as the same ratio used in the catalyst. This process strengthens the gel, and confirms all hydrolysis/condensation reactions are complete. Then after 2 days, the gel can be soaked in pure EtOH, in order to remove all water from within the gel. Several soakings are required to insure this. After 3-6 soakings (depending on density/size), the gels are ready for supercritical drying. In particular, the Sol-gel was then immersed in an aging solution, composed of a 100:1 ratio of Ethanol and $NH_4OH$ (i.e. 400 mL of EtOH with 4 mL of $NH_4OH$), for 48 hours to form a complete aged gel. The sol-gel was then submersed in pure ethanol several times (each time lasting 20+ hours), in order to produce an alcogel. After all the water was removed from within the sol-gel, the alcogel was ready for supercritical drying. For each water type (deionized or rainwater), 4 gel formulas were made (a control aerogel, an Aerogel+SWNT at a given concentration: 1×, another Aerogel+SWNT at two times the previous concentration: 2×, and then a third Aerogel+SWNT at four times the initial concentration: 4×). In all, 8 samples were produced.

SFE Drying:

The conventional supercritical procedure required a specially designed autoclave, to vent Carbon Dioxide ($CO_2$) through the gels (to excavate ethanol), then increase the temperature and pressure, in order to vent all $CO_2$, leaving an Aerogel. Unfortunately, a Supercritical Fluid Extractor (SFE) had to be used in place of the specially designed autoclave. An alternate supercritical drying procedure (inspired by the standard) was developed exclusively for the SFE. The gels are placed within a semi-automated autoclave, and slowly, the interior of the samples is filled with liquid carbon dioxide. The ethanol is vented out, and more carbon dioxide is emitted with the autoclave, until all the ethanol has been extracted. Then, the autoclave is set to the supercritical level, where the carbon dioxide becomes a gas, and the carbon dioxide gas is vented out, leaving a finished "carbon aerogel".

In particular, the process began first with a wet-gel sample being placed in a vessel that has been filled with ethanol, giving it an initial systematic pressure of about 1300 psi. Since the SFE was incapable of cooling, the vessel had to first be manually cooled. The vessel was then filled with $CO_2$, for approximately 8 hours (which caused an increase in pressure, to about 1530 psi). The outlet valve was then open to empty the ethanol and $CO_2$ flow. When all the liquid had been vented, the valve was be closed, and approximately 2 hours later, the $CO_2$ flow was terminated. This left a fair amount of $CO_2$ in the vessel, allowing the cavities of the gel sample to be inhabited. After 12 hours, the outlet valve was opened this time, venting out the remaining $CO_2$. This caused an impending decrease in pressure. It was crucial that the $CO_2$ be vented in a controlled, slow, consistent manner . . . at a rate of 5-10 psi per minute. After equilibrium had been attained inside the vessel (100-40 psi), the samples were observed. In this experiment, very small samples were produced, due to the narrow, cylindrical contours of the SFE vessel.

Semi-Automated Autoclave Drying:

In this supercritical procedure, the suggested specially designed autoclave was used. This worked quite differently from the SFE. This system allowed the vessel to be automatically pre-cooled and pressurized. The initial temperature/pressure was placed at around 10° C./800 psi (respectively). After the $CO_2$ condensed into liquid, the vessel was flushed once. After this time, more liquid $CO_2$ was vented in, and again flushed. This was repeated 4-5 times (approximately 12 hours for each flush), until no ethanol was present in the discharge waste. At this time, both the temperature and pressure were set above the supercritical point of $CO_2$(30°, 1000 psi). After a few hours, the vessel was given a final excavation, at a slower, controlled rate than usual (20-24 hours).

One-Step Sample Testing:

Both the normal aerogel and SWNT aerogel samples were prepared and dried in essentially the same manner. Approximately 20 hours later, then samples were analyzed in the TGA for comparative testing. Tested sizes were a fraction of sample sizes, with a mass of 4.236 mg (aerogel) and 3.817 mg (for SWNT+aerogel). The TGA was set at a heating rate of 10° C./min (50° F./min), beginning at the subsequent room temperature and lasting until a final temperature of 800° C. (1472° F.). This test was performed in order to show whether the aerogel had gained a more stabilized behavior during increasing torridity.

Two-Step Sample Testing:

More in-depth, conclusive tests were performed on these samples. For TGA testing, the deionized SWNT samples were utilized. The TGA was set at a heating rate of 10° C./min (50° F./min), beginning at the subsequent room temperature and lasting until a final temperature of 700° C. (1292° F.). For the XPS testing, the DI control and SWNT 2× samples were used. This test was performed in order to observe the chemical composition and bonding that took place in the surface of the material(s). The XPS used a magnesium x-ray to refract electrons out of the atomic orbital (of the composite sample) to the electron detector, in order to determine bonding energy. With this energy level and number of electrons, the electron "type" and abundance could be determined. The TA was used in order to assess the mechanical strength of the materials. The TA used three-point bending as a method of fracturing the sample. This test provided a Stress VS Strain relationship, where (when graphically analyzed) the graph slopes equaled the corresponding values for Young's Modulus. All two-step samples were finally examined more closely, using the SEM. The SEM was set to a frequency of 20 kv, providing a magnification of 2000× (in an area of ~5 microns).

Lastly, a set of High-Density gels was made for two-step gels. These gels were expected to be 1.5-3 times denser, and ultimately stronger. The procedure for making them is similar to that of the standard density two-step gels, but the gel solution, along with the catalyst, is the only alteration. The SILBOND and $NH_4OH$ ratio is increased by a factor of 1.5×; the water ratio increased by 1.25×; the ethanol ratio remains unchanged. The SILBOND and $NH_4OH$ amount must be higher, because they serve as the "glass" solid portion of the sample, while the slight increase in water completes hydrolysis reactions.

Density for both standard and high density samples was calculated manually, using the formula (D=M/V). The samples were measured by dimension, using a ruler, and then weighed, using an electronic metric scale. Also, Water conductivity of the samples was taken using a special conductivity probe. The constraints of the probe (which was designed to calculate the conductivity of liquid only) may have contributed to inaccuracies in data. In an attempt to ignore this inconvenience, the samples were submerged in DI water, and slightly fractured. The conductivity of the DI water was taken, then the conductivity of the same DI water sample containing the gel pieces. A formula (Conductivitysample=Conductivity sample+water−Conductivitywater) was used to calculate sample conductivity. The units of obtained values were in micro "mhos" ($\Omega$-1). Since resistance is measured in "ohms" ($\Omega$), and conductivity is the opposite of resistivity, "mhos" ($\Omega^{-1}$) is the appropriate unit name.

Figure 8:
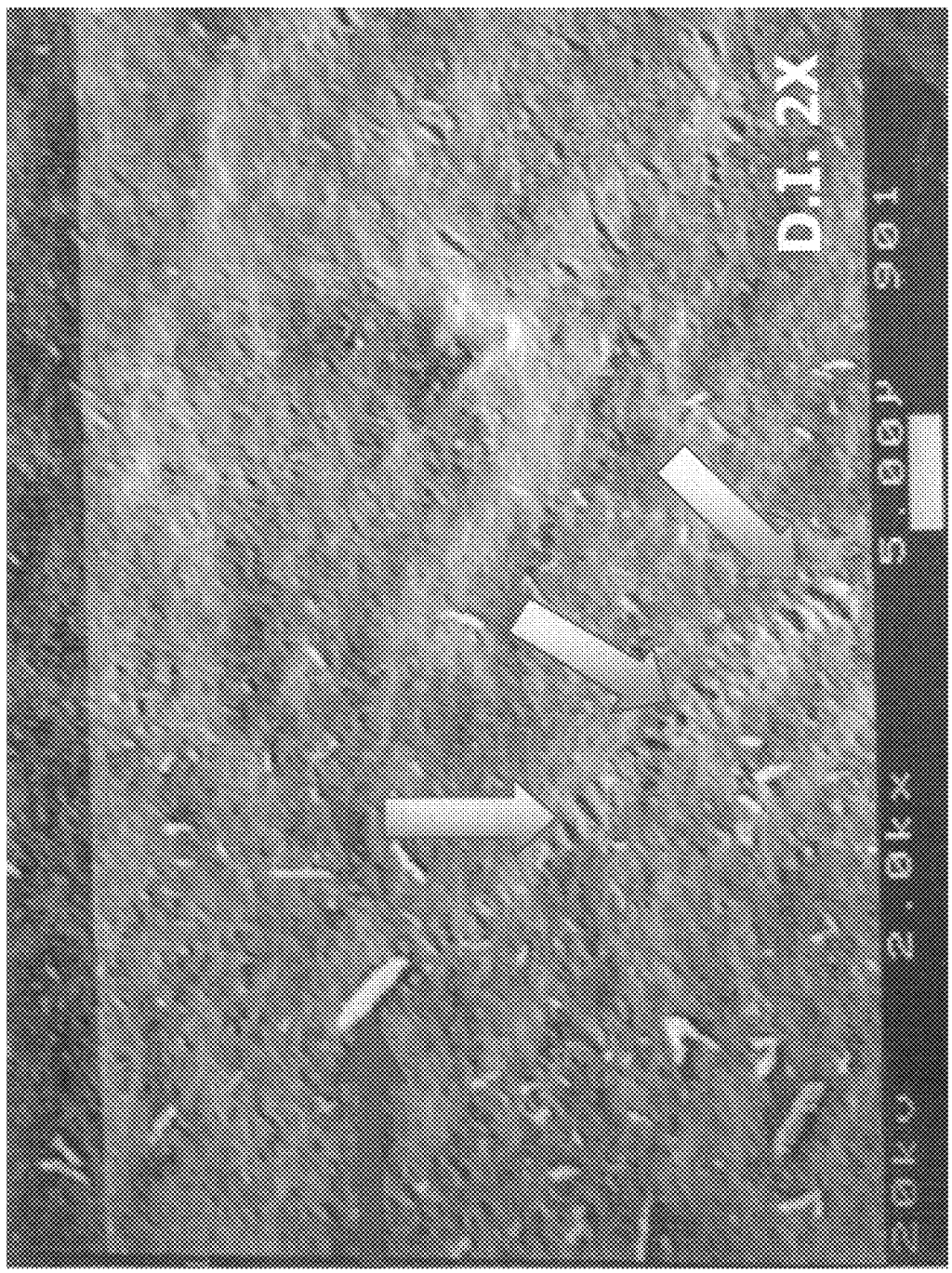
FIG. 8 shows an SEM (Scanning Electron Microscopy) enhanced image of a section of the carbon aerogel, which displays a section in which interlocking occurs between the aerogel structure and carbon nanotube bundles.

FIG. 8 shows an SEM (Scanning Electron Microscopy) enhanced image of a section of the carbon aerogel, which displays a section in which interlocking occurs between the aerogel structure and carbon nanotube bundles.

While more testing of this composite is required to confirm all aforementioned possibilities, the initial tests have provided optimistic results. It has been shown that aerogels/xerogels containing carbon nanotubes are substantially more conductive than those without.

While this process briefly and concisely describes one method of silica aerogel and carbon nanotube amalgamation, there are many other methods, as described in the earlier aforementioned statements. This invention is comprised of not only the described method, but also the other three.

The invention claimed is:

1. A composite material comprising:
   silicate;
   carbon nanotubes; and
   a catalyst;
   wherein the composite material comprises a silica aerogel laced and reinforced with a uniform dispersion of said carbon nanotubes, and wherein said carbon nanotubes are dispersed through the composite material without a carbon nanotube layer being formed on an exterior surface of the composite material.

2. The composite material of claim 1, wherein the silicate is selected from the group consisting of an ethyl alcohol-ethyl polysilicate compound, tetraethyl-orthosilicate (TEOS), and tetramethyl-orthosilicate (TMOS).

3. The composite material of claim 1, wherein said dispersed carbon nanotubes are selected from the group consisting of dispersed carbon fullerenes, dispersed endohedral fullerenes, dispersed carbon nanoparticles, dispersed single-walled carbon nanotubes, and dispersed multi-walled carbon nanotubes.

4. The composite material of claim 1, wherein said carbon nanotubes comprises single-walled carbon nanotubes.

5. The composite material of claim 1, further comprising a surfactant.

6. The composite material of claim 5, wherein the surfactant comprises polyoxyethylenesorbitan monopalmitate.

7. The composite material of claim 1, wherein said dispersed carbon nanotubes comprise sonicated carbon nanotubes.

8. The composite material of claim 7, wherein the sonicated carbon nanotubes are sonicated using a machine that produces an ultrasonic level pulse.

9. The composite material of claim 1, wherein said dispersed carbon nanotubes are added prior to a solgel phase or prior to an alcogel phase.

10. The composite material of claim 1, wherein the catalyst comprises $NH_4OH$.

11. The composite material of claim 1, wherein the carbon nanotubes are generated by a carbon arc process.

12. A method of forming a composite material comprising:
    disposing a gel solution into a mold, the gel solution comprising ethanol, silicate, carbon nanotubes and a catalyst;

curing the gel solution in the mold to form a solgel;

removing the solgel from the mold;

soaking the solgel in an aging solution comprising ethanol and water;

after soaking the solgel in the aging solution, soaking the solgel in ethanol; and after soaking the solgel in ethanol, supercritically drying the solgel to form the composite material, wherein the composite material comprises a silica aerogel laced and reinforced with a uniform dispersion of said carbon nanotubes, and wherein said carbon nanotubes are dispersed through the composite material without a carbon nanotube layer being formed on an exterior surface of the composite material.

13. The method of claim 12, further comprising:

prior to disposing the gel solution into the mold, applying a vacuum treatment to the gel solution.

14. The method of claim 13, further comprising:

after applying the vacuum treatment to the gel solution, sonicating the gel solution.

15. The method of claim 12, wherein supercritically drying the solgel comprises:

placing the solgel and ethanol in a vessel of a supercritical fluid extractor;

cooling the vessel containing the solgel and ethanol;

after cooling the vessel, filling the vessel with carbon dioxide;

after filling the vessel with carbon dioxide, emptying the vessel of ethanol; and after emptying the vessel of ethanol, emptying the vessel of carbon dioxide.

16. The method of claim 12, wherein supercritically drying the solgel comprises:

placing the solgel in a vessel of a semi-automated autoclave;

filling the vessel containing the solgel with carbon dioxide;

after filling the vessel with carbon dioxide, flushing the vessel; and repeating the filling and flushing.

17. The method of claim 12, wherein the carbon nanotubes are generated by a carbon arc process.

* * * * *